United States Patent
Ocke et al.

(10) Patent No.: US 8,164,782 B2
(45) Date of Patent: Apr. 24, 2012

(54) TRANSFORMING PARTIALLY SPECIFIED PROCESSING INSTRUCTIONS AND PDL DATA INTO A PRODUCT DESCRIPTION

(75) Inventors: Kirk J. Ocke, Ontario, NY (US); Michael David Shepherd, Ontario, NY (US); Dale Ellen Gaucas, Penfield, NY (US); Philip C. Rose, Sodus, NY (US)

(73) Assignee: Xerox Corporation, Norwalk, CT (US)

( * ) Notice: Subject to any disclaimer, the term of this patent is extended or adjusted under 35 U.S.C. 154(b) by 1078 days.

(21) Appl. No.: 11/982,046

(22) Filed: Nov. 1, 2007

(65) Prior Publication Data
US 2009/0116055 A1 May 7, 2009

(51) Int. Cl.
*G06K 15/00* (2006.01)
*G06F 3/12* (2006.01)
(52) U.S. Cl. .................. 358/1.18; 358/1.13; 358/1.15
(58) Field of Classification Search .............. 358/1.15, 358/1.13, 1.18; 399/407, 408
See application file for complete search history.

(56) References Cited

U.S. PATENT DOCUMENTS

| 7,570,376 B2 * | 8/2009 | Wiechers ............... 358/1.13 |
| 2002/0089689 A1 * | 7/2002 | Ferlitsch et al. ........... 358/1.15 |
| 2005/0068569 A1 * | 3/2005 | Hull et al. ............... 358/1.15 |

* cited by examiner

*Primary Examiner* — Benny Q Tieu
*Assistant Examiner* — Eric A Rust
(74) *Attorney, Agent, or Firm* — Kermit D. Lopez; Luis M. Ortiz; Kevin Soules

(57) ABSTRACT

A rule based system can produce a formal product description when only partially specified processing instructions and page description language (PDL) files are available. The PDL files contain product content data and can contain product description data. The partially specified processing instructions can be obtained from PDL file metadata or from other sources such as a Job Definition Format (JDF) Graybox. A knowledge based reasoning module can use the product description data and partially specified processing instructions to produce a formal product description from which a process network can be automatically produced.

6 Claims, 3 Drawing Sheets

TRANSFORMING PARTIALLY SPECIFIED PROCESSING INSTRUCTIONS AND PDL DATA INTO A PRODUCT DESCRIPTION

TECHNICAL FIELD

Embodiments relate to the fields of printed publications, electronic documents, and printing. Embodiments also relate to the fields of document formatting, electronic document formats. Embodiments further relate to the fields of printing instructions, print jobs, print job control, and automatic publishing.

BACKGROUND

Documents, such as books, pamphlets, and cards are produced by the completion of a number of process steps. Those steps can include any or all of imposition, printing, binding, cutting, drilling, folding, laminating, sealing, embossing, scoring, and myriad other processes. Cards can be produced by the steps of printing multi card pages onto card stock and then cutting the pages into individual cards. Books can be produced by the steps of printing the pages and cover, folding them, binding them, and then cutting them to size. Every step has processing instructions.

In automated printing systems, a process network can contain all of the steps and processing instructions for producing a product. The processing parameters must be fully specified. In some publishing systems, all the parameters for a job are not fully specified. A person must intervene to supply the missing parameters and, as such, the process is not fully automated. Methods and systems for automatically supplying missing parameters are needed.

BRIEF SUMMARY

Aspects of the embodiments address limitations and flaws in the prior art by automatically supplying the required parameters for a process network.

It is therefore an aspect of the embodiments that print products are described by predefined characteristics such as binding, folding, finishing dimension, and cover.

It is another aspect of the embodiments that there is one or more page description language (PDL) files and there one or more partially specified processing instructions. The PDL files can contain product content data. The partially specified processing instructions can be supplied by a JDF Digital Printing Graybox file or by a PDL file. In general, the partially specified processing instructions have one or more missing parameters. As such, the partially specified processing instructions can not be executed until the missing parameters are specified and the processing instructions are fully specified.

It is a further aspect of the embodiments that an extraction module extracts product description data from the files. A knowledge-based reasoning module can then transform the product description data and the predefined characteristics into a formal product description. The product description can be used by an automated publishing system to infer information about the missing parameters of the partially specified processing instructions.

It is yet another aspect of the embodiments that a process generation module can produce a process network from the formal product description, from at least one partially specified processing instruction, at least one PDL file and a product description generated from the aforementioned partially specified processing instruction and PDL file. The process network contains a complete set of processing instructions for directing an automatic publishing system to produce complete printed publications.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

A rule based system can produce a formal product description when only partially specified processing instructions and page description language (PDL) files are available. The PDL files contain product content data and can contain product description data. The partially specified processing instructions can be obtained from PDL file metadata or from other sources such as a Job Definition Format (JDF) Graybox. A knowledge based reasoning module can use the product description data and partially specified processing instructions to produce a formal product description from which a process network can be automatically produced.

Figure 1:
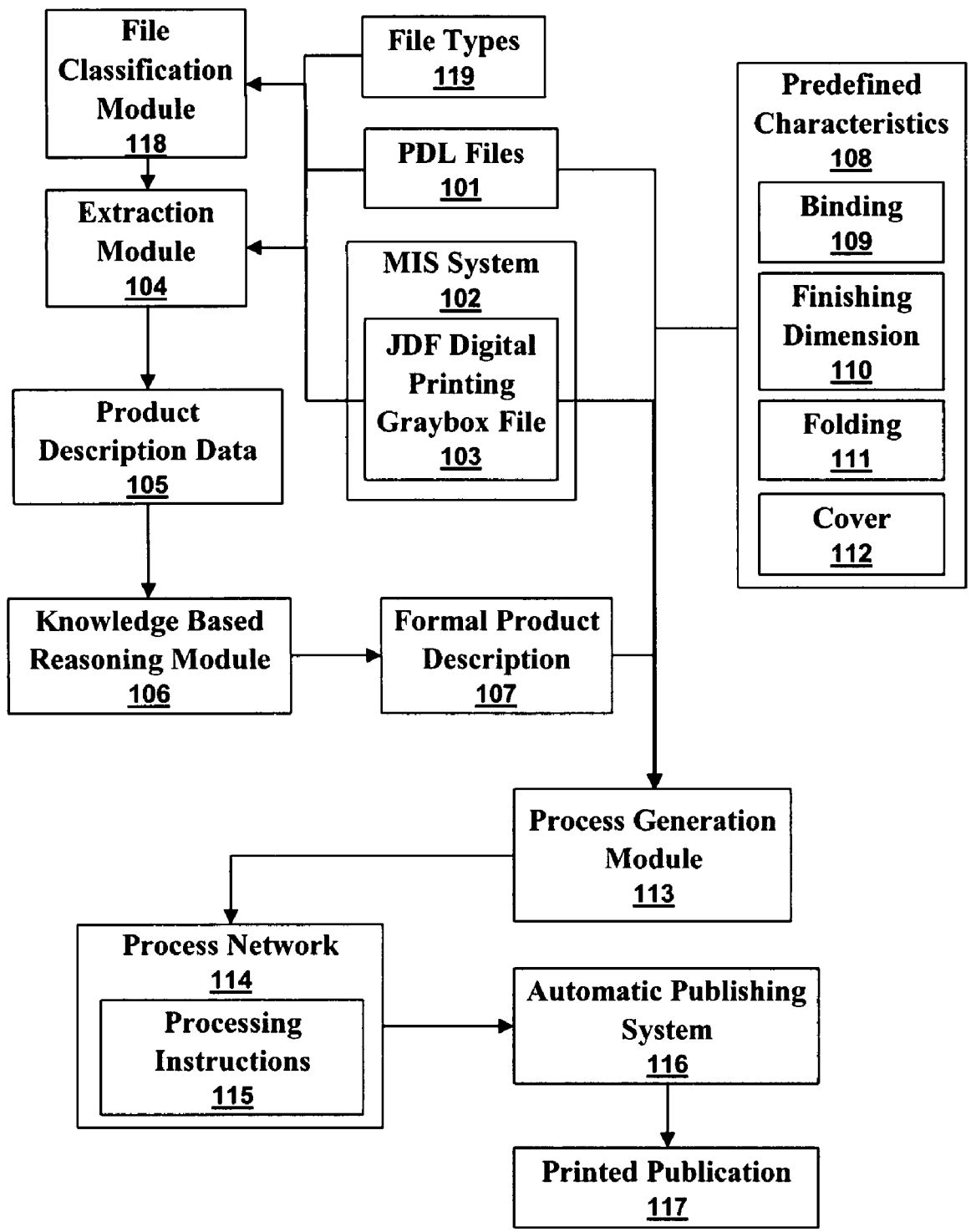
FIG. 1 illustrates a system that automatically produces a printed publication when one of the inputs is a JDF Digital Printing Graybox file in accordance with aspects of the embodiments.

FIG. 1 illustrates a system that automatically produces a printed publication when one of the inputs is a JDF Digital Printing Graybox file 103 in accordance with aspects of the embodiments. The JDF Digital Printing Graybox file 103 is obtained from an MIS system 102. PDL files 101 containing content information and perhaps description information are also obtained. Content information specifies what is printed whereas description information specifies how and where the content is printed. Further more, the JDF Digital Printing Graybox file can also specify the PDL files 101 to obtain.

The PDL files 101 have file types 119 such as PostScript, PDF, and PDF with embedded print production metadata. A file classification module 118 determines the file type 119 of the PDL files 101 and, if necessary, of the JDF Digital Printing Graybox file 103 and passes the type information to an extraction module 104 that then extracts product description data 105 from its inputs. A knowledge based reasoning module 106 can transform the product description data 105 into a formal product description 107. A JDF Product Intent is an example of a formal product description that is familiar to those practiced in the art of digital publishing. Those skilled in the art of digital publishing are also familiar with PDF, PostScript, PDL, and JDF Digital Printing Graybox files.

A process generation module 113 can produce a process network 114 from the PDL files, JDF Digital Printing Graybox file, and a set of predefined characteristics 108. The predefined characteristics 108 can be considered as a set of default values for necessary information such as binding 109, finishing dimension 110, folding 111, and cover 112. A PDL file with embedded print production metadata, such as PDF with XMP metadata, can contain sufficient data that neither a JDF Digital Printing Graybox file nor predefined characteristics 108 are needed. The Xerox Intent2Process conversion system is an example of a currently available process generation module that can convert a JDF Product Intent into a process network.

The process network 114 contains processing instructions 115 for each processing step by which an automatic processing system 116 produces a printed publication 117.

Figure 2:
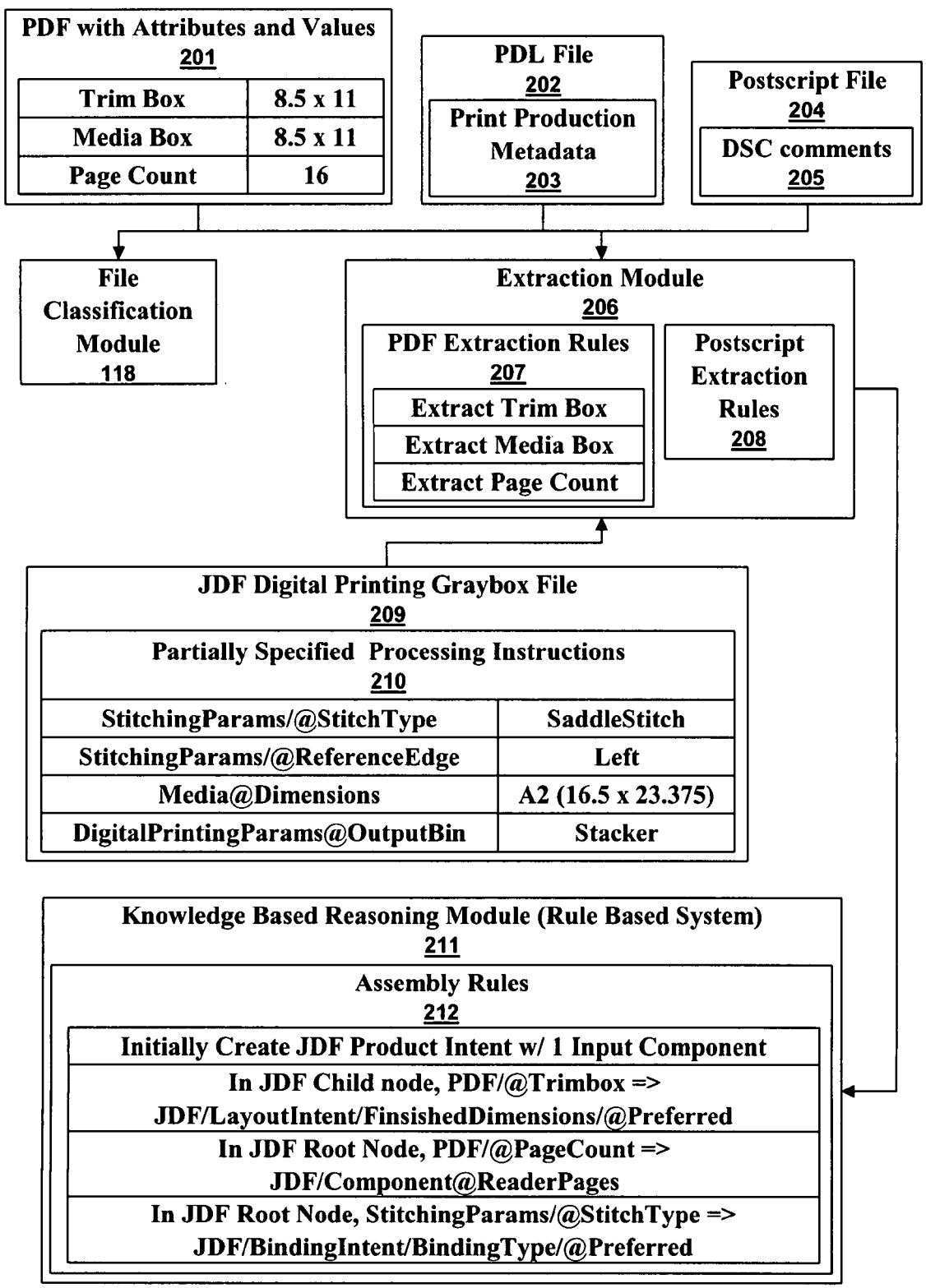
FIG. 2 illustrates rule based systems in accordance with aspects of the embodiments.

FIG. 2 illustrates rule based systems in accordance with aspects of the embodiments. Three types of PDL file are illustrated. One is a PDL file 202 with print production metadata 203. Another is Postscript 204 with Document Structuring Conventions (DSC) comments 205. The third is a PDF file with attributes and values 201. A file classification module 118 determines the file types and an extraction module 206 extracts the product description data.

The extraction module 206 of FIG. 2 is a rule based system. It contains and uses specific extraction rules for the different file types. In particular, the PDF extraction rules 207 and the Postscript extraction rules 208 are illustrated.

A JDF Digital Printing Graybox File 209 is illustrated containing partially specified processing instructions 210 that can be passed, if necessary, to the extraction module 206 or to the knowledge based reasoning module 211. The knowledge based reasoning module 211 is illustrated as a rule based system 211 containing assembly rules 212.

Figure 3:
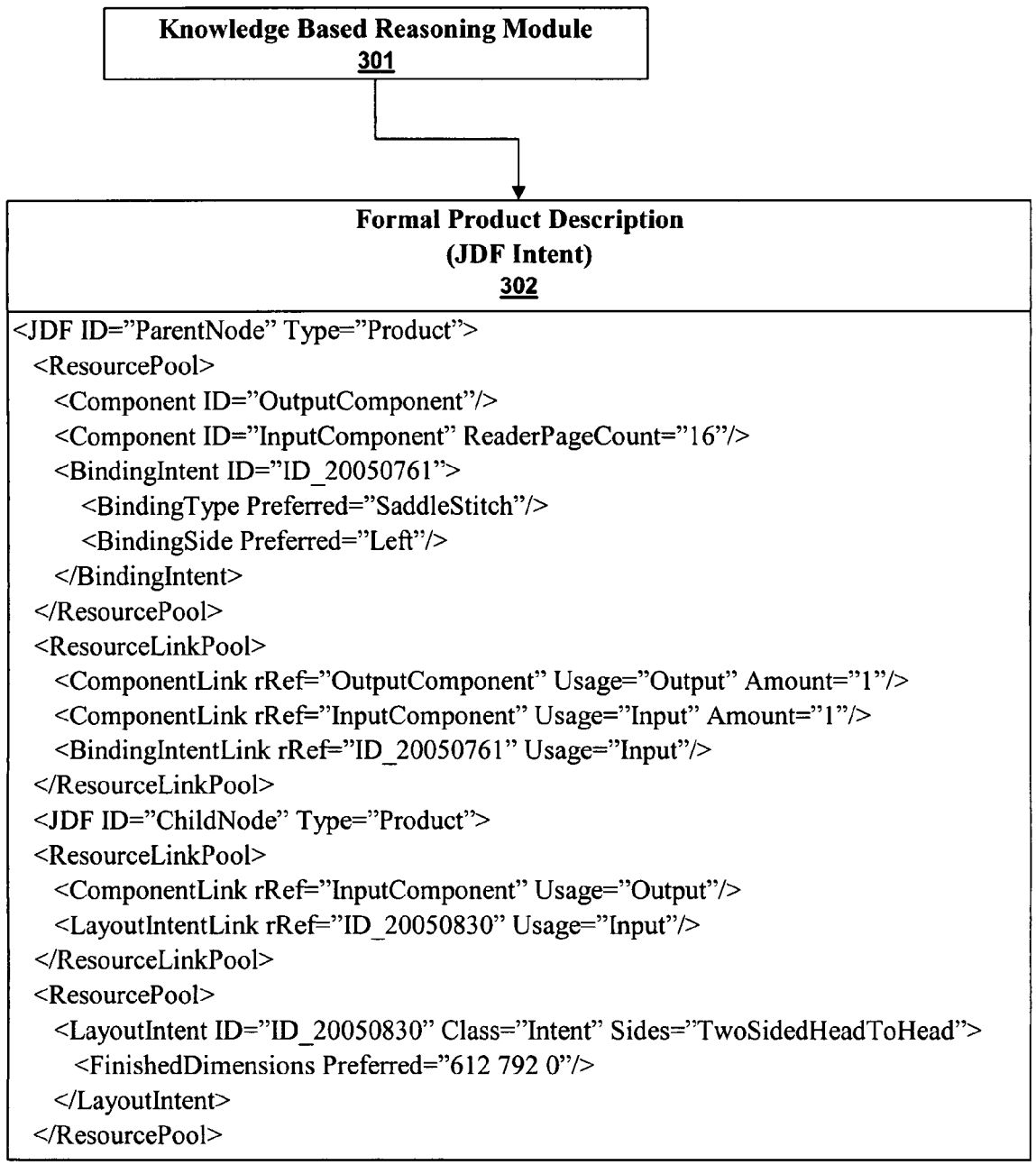
FIG. 3 illustrates a formal product description in accordance with aspects of the embodiments.

FIG. 3 illustrates a formal product description 302 in accordance with aspects of the embodiments. The formal product description 302 is a JDF Intent and is the direct output of a knowledge based reasoning module 301. The illustrated content of the formal product description 302 is an example of the format and contents of a JDF Intent. As discussed earlier, the Xerox Intent2Process system can use the JDF Intent when producing a process network.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of non-transitory media executed by a computer comprising:

a multiplicity of predefined characteristics describing print products wherein the predefined characteristics comprise at least one of binding, folding, finishing dimension, and cover;

at least one file comprising at least one page description language (PDL) file comprising product content data wherein at least one of the at least one file comprises at least one partially specified processing instruction, and at least one JDF Digital Printing Graybox file;

an extraction module that extracts product description data from the files;

a multiplicity of extraction rules wherein each extraction rule is associated with at least one of the file types and wherein the extraction module applies the extraction rule set to the files to thereby produce product description data;

wherein at least one of the at least one page description language (PDL) file comprises embedded print production metadata that is extracted as product description data by the extraction module and wherein at least one of the at least one page description language (PDL) file comprises a postscript file comprising embedded Document Structuring Conventions comments that are extracted as product description data by the extraction module;

a knowledge based reasoning module that transforms the product description data and the predefined characteristics into a formal product description, wherein the knowledge based reasoning module is a rule based system comprising at least one assembly rule; and a process generation module that produces a process network from the formal product description, the at least one partially specified processing instruction, and the at least one page description language (PDL) file wherein the process generation module is a rule based system and wherein the process network comprises a complete set of processing instructions for directing an automatic publishing system to produce complete printed publications.

2. The system of claim 1 wherein the knowledge based reasoning module comprises at least one assembly rule for creating and modifying JDF product intent.

3. A system of non-transitory instruction media comprising:

a multiplicity of predefined characteristics describing print products wherein the predefined characteristics comprise at least one of binding, folding, finishing dimension, and cover;

at least one file comprising at least one page description language (PDL) file comprising product content data wherein at least one of the at least one file comprises at least one partially specified processing instruction, and at least one JDF Digital Printing Graybox file;

a file classification module that classifies each one of the files as one of a multiplicity of file types;

an extraction module that extracts product description data from the files wherein the file type of each of the files guides the extraction;

a multiplicity of extraction rules wherein each extraction rule is associated with at least one of the file types and wherein the extraction module applies the extraction rule set to the files to thereby produce product description data;

wherein at least one of the at least one page description language (PDL) file comprises embedded print production metadata that is extracted as product description data by the extraction module;

wherein at least one of the at least one page description language (PDL) file comprises a postscript file comprising embedded Document Structuring Conventions comments that are extracted as product description data by the extraction module;

a knowledge based reasoning module that transforms the product description data and the predefined characteristics into a formal product description wherein the knowledge based reasoning module is a rule based system comprising at least one assembly rule; and a process generation module that produces a process network from the formal product description, the at least one partially specified processing instruction, and the at least one page description language (PDL) file wherein the process generation module is a rule based system and wherein the process network comprises a complete set of processing instructions for directing an automatic publishing system to produce complete printed publications.

4. The system of claim 3 wherein the knowledge based reasoning module comprises at least one assembly rule for creating and modifying JDF product intent.

5. A system comprising:

a multiplicity of predefined characteristics describing print products wherein the predefined characteristics comprise at least one of binding, folding, finishing dimension, and cover;

at least one file comprising at least one page description language (PDL) file comprising product content data wherein at least one of the at least one file comprises at least one partially specified processing instruction, and at least one JDF Digital Printing Graybox file;

a means for extracting product description data from the files comprising a means for classifying each of the files as one of a multiplicity of file types;

a multiplicity of type extraction means wherein the file types determine which of the type extraction means extracts product description data from any one of the files, wherein at least one of the at least one page description language (PDL) file comprises embedded print production metadata that is extracted as product description data by the extraction module and wherein at least one of the at least one page description language (PDL) file comprises a postscript file comprising embedded Document Structuring Conventions comments that are extracted as product description data by the extraction module;

a means for transforming the product description data and the predefined characteristics into a formal product description wherein the means for transforming the product description and the predefined characteristics into a formal product description is a rule based means comprising at least one assembly rule; and a means for producing a process network from the formal product description, the at least one partially specified processing instruction, and the at least one page description language (PDL) file wherein the means for producing the process network is a rule based system and wherein the process network comprises a complete set of instructions for directing an automatic publishing system to produce complete print products.

6. The system of claim 5 wherein the means for transforming the product description data and the predefined characteristics into a formal product description comprises at least one assembly rule and further comprises a means of applying the at least one assembly rule to the product description data and to the predefined characteristics to produce the formal product description.

* * * * *